May 23, 1967     E. R. PHALEN ETAL     3,320,936
BI-ROTARY ENGINE WITH OSCILLATING VANES
Filed Dec. 23, 1964

Edward R. Phalen
James R. Moe
INVENTORS

May 23, 1967   E. R. PHALEN ETAL   3,320,936
BI-ROTARY ENGINE WITH OSCILLATING VANES
Filed Dec. 23, 1964   5 Sheets-Sheet 2

Edward R. Phalen
James R. Moe
INVENTORS

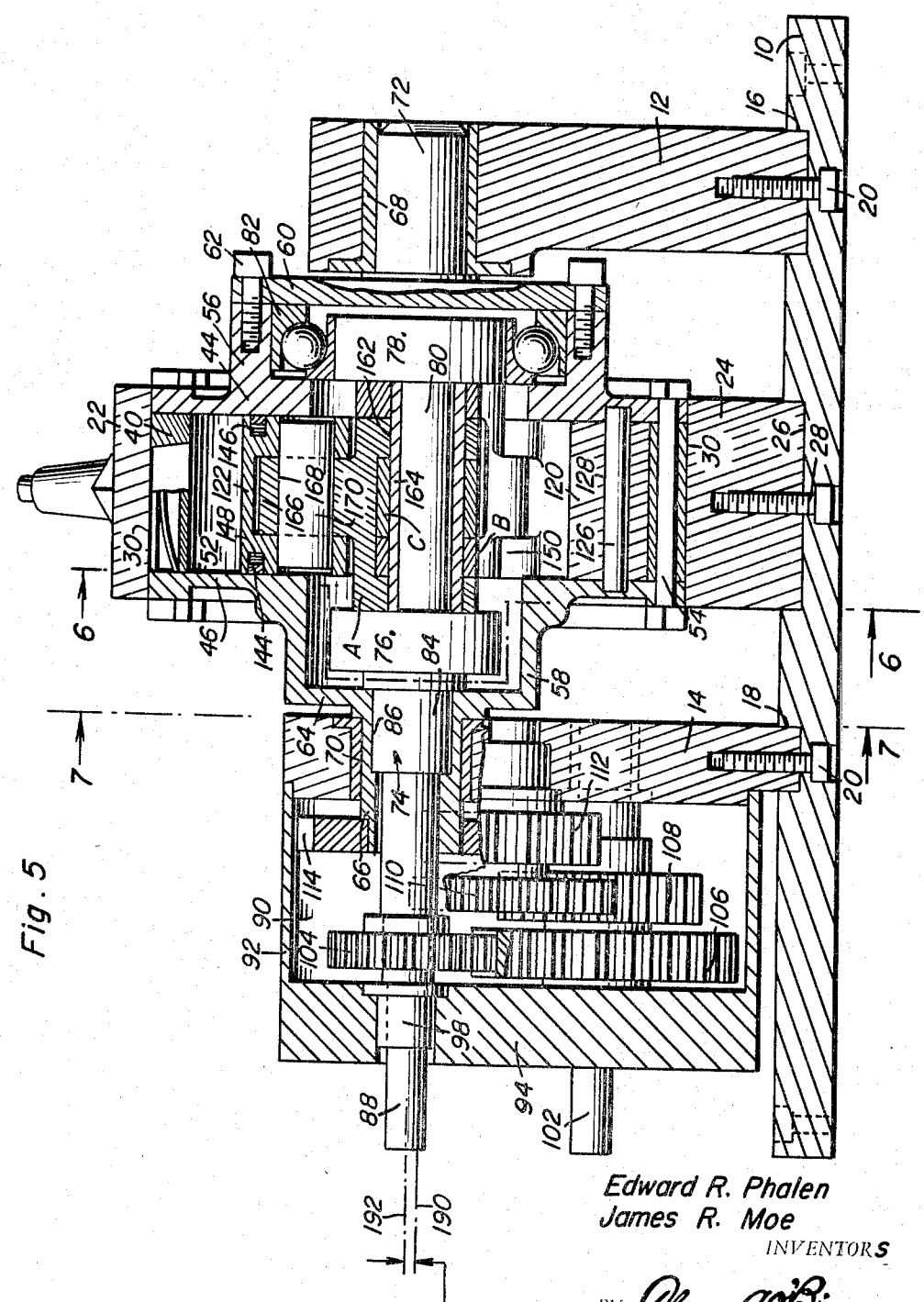

May 23, 1967  E. R. PHALEN ETAL  3,320,936
BI-ROTARY ENGINE WITH OSCILLATING VANES
Filed Dec. 23, 1964  5 Sheets-Sheet 4

Edward R. Phalen
James R. Moe
INVENTORS

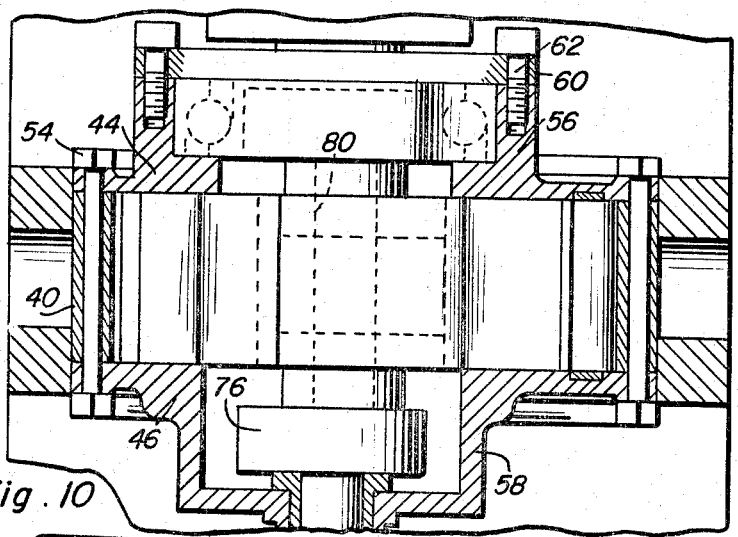
Fig. 9
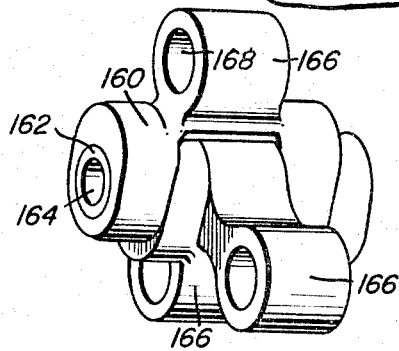
Fig. 10
Fig. 11
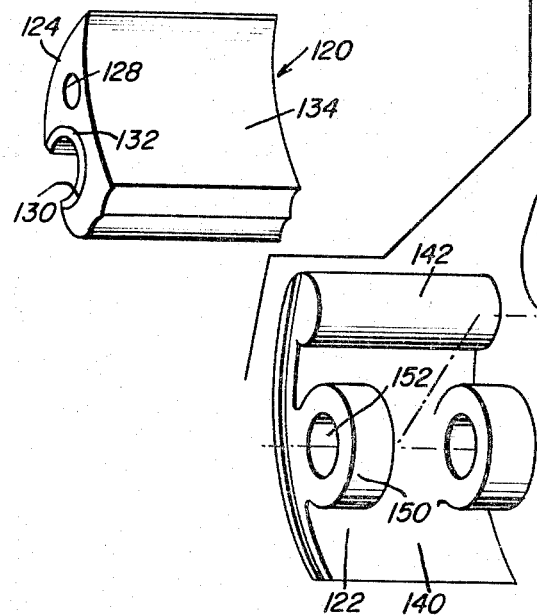
Fig. 12
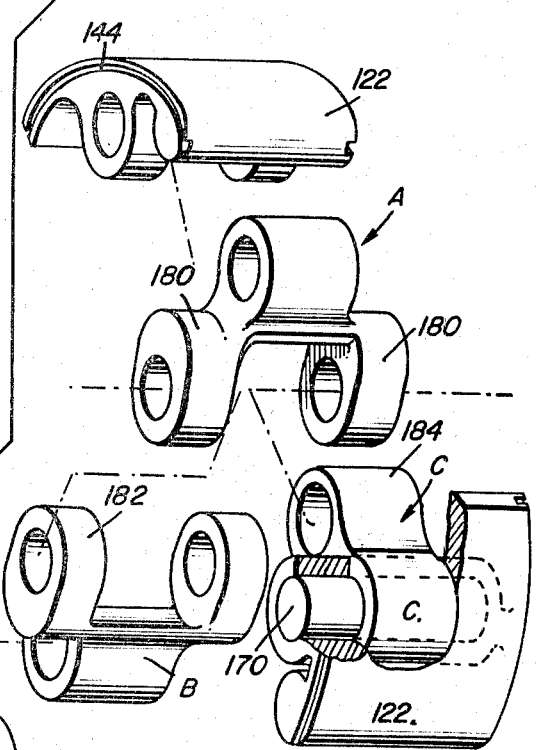
Edward R. Phalen
James R. Moe INVENTORS
BY Clarence A. O'Brien
and Harvey B. Jacobson
Attorneys

United States Patent Office 3,320,936
Patented May 23, 1967

3,320,936
BI-ROTARY ENGINE WITH OSCILLATING VANES
Edward R. Phalen, R.F.D. 3, Cortland, N.Y. 13045, and James R. Moe, Jacksonville, N.Y. 14854
Filed Dec. 23, 1964, Ser. No. 420,713
10 Claims. (Cl. 123—43)

This invention comprises a novel and useful bi-rotary engine with oscillating vanes and more particularly pertains to an internal combustion engine of the bi-rotary type having a stator, a rotor revolvable therein and with a plurality of operating vanes swingably mounted within working chambers within the rotor.

The primary object of the invention is to provide an internal combustion engine of the bi-rotary type having a mechanically greatly simplified, compact and lightweight construction with a great reduction in the number of its moving parts as compared with conventional engines.

A further object of the invention is to provide an internal combustion engine which will largely eliminate reciprocating masses and the problem produced by the reversing inertia effects and obtain in lieu thereof a better torque balancing of the engine.

Still another purpose of the invention is to provide an internal combustion engine which will eliminate the usual valve system and valve operating mechanism and replace it with a much simplified arrangement for the inlet and exhaust of the fluids of the engine.

A still further object of the invention is to provide an internal combustion engine which will utilize oppositely rotating crankshaft and cylinder and piston units for balancing and obtaining multiple power impulses per revolution.

Yet another object of the invention is to provide a simplied and improved system for supplying combustible charges to the working chambers and for discharging combustion products therefrom during the operation of the engine.

An additional object of the invention is to provide an internal combustion engine in which wear is reduced considerably by effecting a relatively low rotor speed in comparison to the crankshaft speed and the number of cycles of the engine operation.

Yet another object of the invention is to provide for an internal combustion engine improved sealing means with the reduction of the speeds of movement of the sealing elements relative to the associated slidably engaged surfaces with which they cooperate thereby reducing wear and improving the efficiency of the sealing operation.

Still another object of the invention is to provide a simplified and improved pivotal mounting of the oscillating vane piston of a rotary engine.

Another important object of the invention is to provide a more compact and simplified connecting rod assembly for a rotary internal combustion engine.

And a final important object to be specifically enumerated herein resides in the provision of an internal combustion engine which will obtain the maximum lever arm of the piston relative to the crank shaft for obtaining a maximum mechanical efficiency of operation of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a vertical longitudinal central sectional view through the engine, being taken upon an enlarged scale substantially upon the plane indicated by section line 5—5 of FIGURE 6;

FIGURE 9 is a detailed view in horizontal section, parts being broken away and omitted, and being taken substantially upon the plane indicated by section line 9—9 of FIGURE 6;

FIGURE 10 is a perspective view of the connecting rod assembly by which the oscillating vane pistons are connected to the crankshaft of the engine;

FIGURE 11 is an exploded perspective view of the connecting rod and piston assembly and of the oscillating piston vanes, parts being broken away; and FIGURE 12 is a perspective view of the pivot fulcrum of one of the vane pistons.

Figure 1:
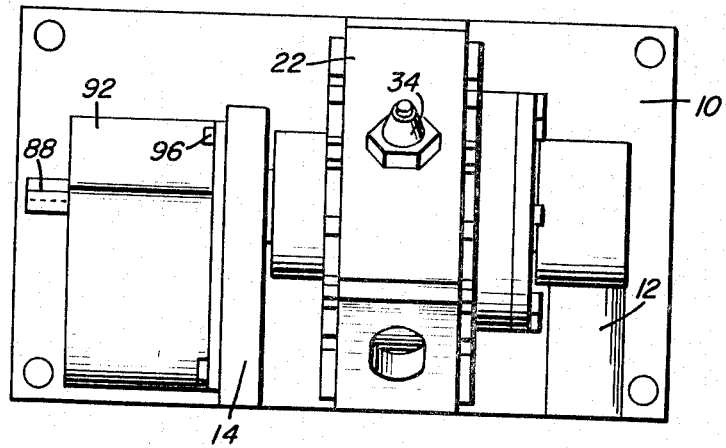
FIGURE 1 is a view in top plan of a suitable embodiment of the bi-rotary internal combustion engine in accordance with this invention.
Figure 2:
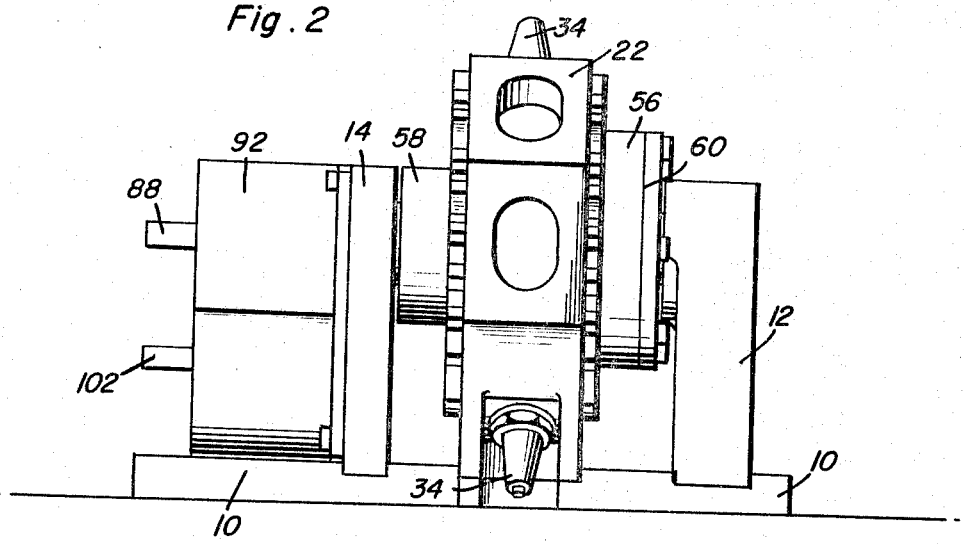
FIGURE 2 is a side elevational view of the arrangement of FIGURE 1.
Figure 3:
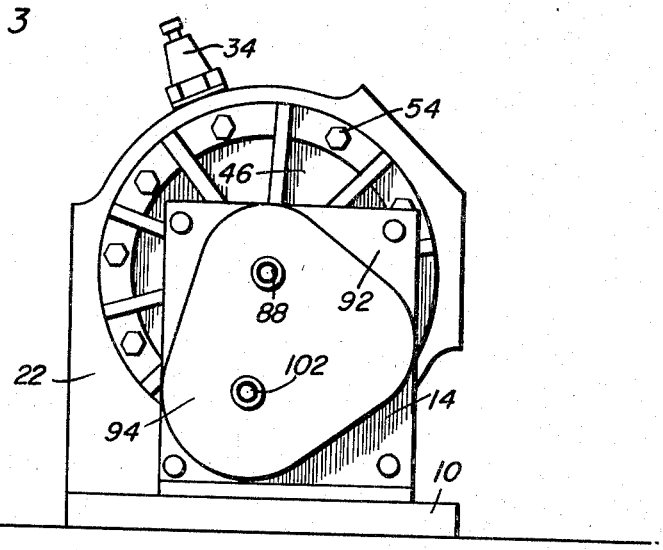
FIGURE 3 is an end elevational view of the engine of FIGURES 1 and 2 taken from the left end thereof.
Figure 4:
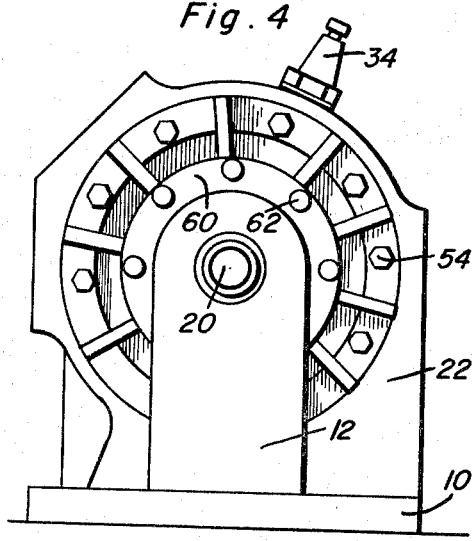
FIGURE 4 is a right end elevational view of the engine of FIGURES 1 and 2.
Figure 7:
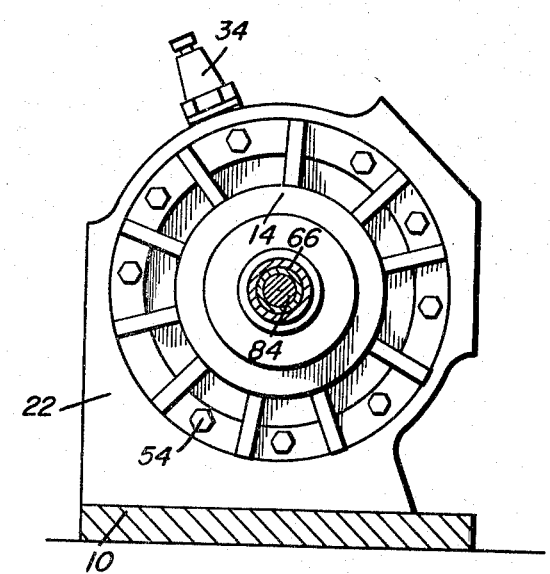
FIGURE 7 is a further vertical transverse sectional view taken upon an enlarged scale substantially upon the plane indicated by section line 7—7 of FIGURE 5.

In the accompanying drawings, there is shown one exemplary embodiment of a rotary internal combustion engine incorporating therein the principles of this invention. Although the engine has been shown as being mounted upon a stationary support structure, it will be appreciated that various types of mounting means may be provided, the invention set forth and claimed hereinafter not being limited to any particular mounting means or support structure. As illustrated, the support structure includes a base 10 which may conveniently be of a flat plate-like configuration and from the top surface of which rises a pair of longitudinally spaced standards 12 and 14. Referring to FIGURE 5 it will be noted that the standards may conveniently be removably seated in channels or recesses 16 and 18 in the top surface of the base 10, it being retained therein as by fasteners 20 projecting upwardly through the base and which may be countersunk therein as shown. Disposed between the two standards and likewise mounted upon the base is a generally cylindrical stator 22 having a downwardly projecting box or bracket 24 upon its bottom surface which likewise is seated in a mounting recess 26 on the top surface of the base and is retained removably thereon as by further fasteners 28.

The stator 22 is of a generally cylindrical configuration having opposite parallel vertical sides with a central opening extending therethrough and indicated by the number 30. The peripheral wall of this opening is cylindrical and is coaxial with the horizontal central axis through the opening and through the stator.

Figure 6:
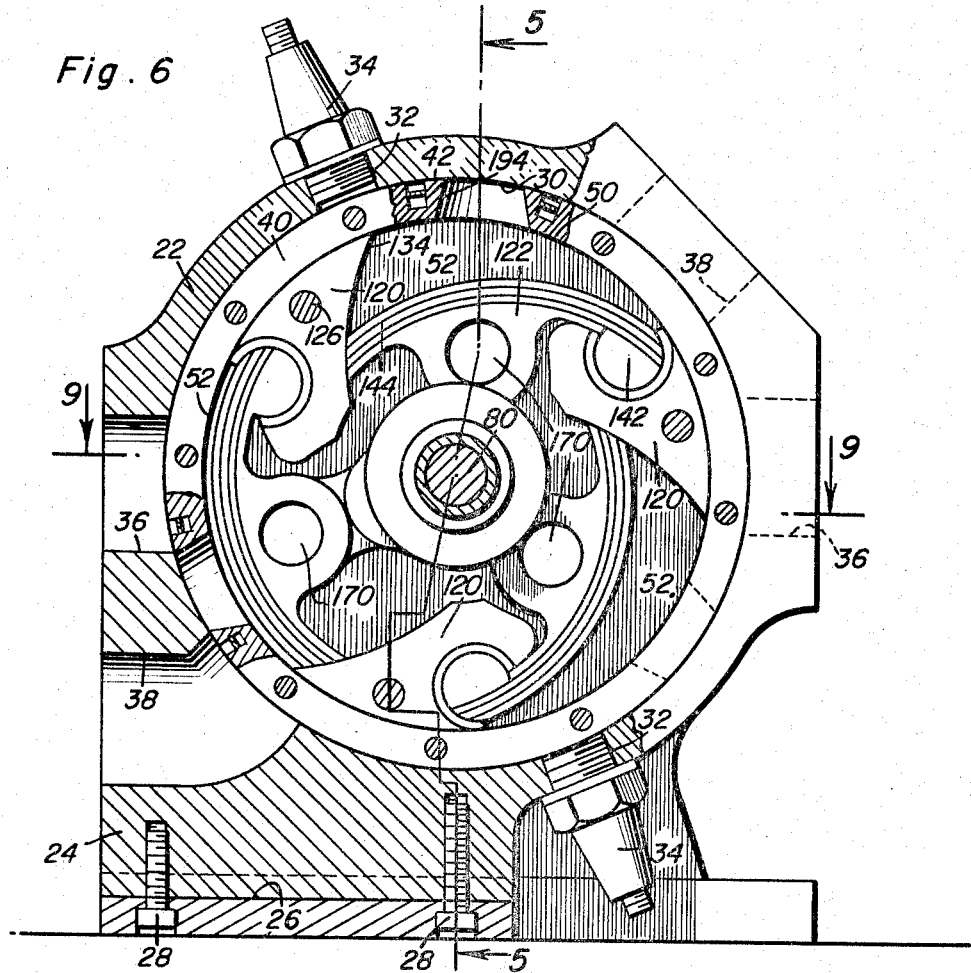
FIGURE 6 is a vertical transverse sectional view through the engine, with parts broken away and parts being shown in section and being taken substantially upon the plane indicated by section line 6—6 of FIGURE 5.

With reference to FIGURE 6 it will be observed that the stator has a number of openings extending inwardly therethrough to intersect the central opening 30. Thus there are provided a pair of diametrically oppositely disposed internally threaded bores as at 32 each of which receives an igniting device such as a spark plug 34. It is to be appreciated, however, that other types of igniting devices may be utilized depending upon whether the engine runs upon the spark ignition system or other combustion systems such as the diesel cycle and the like.

The stator further includes oppositely disposed passages each indicated by the numeral 36, and another set of oppositely disposed passages each indicated by the numeral 38. One pair of passages such as the passages 38 may comprise the exhaust passages of the engine while the other set comprises the inlet passages for the fuel and/or air for the combustion chambers.

Rotatably mounted within the stator 22 and revolving within the cylindrical opening or chamber 30 therein is a cylindrical rotor 40. The rotor 40 is preferably a hollow cylindrical ring-like body having a cylindrical external periphery 42 which is disposed in closely spaced relation to the inner periphery 30 of the stator. Suitable sealing means, to be set forth hereinafter, insure a fluid-tight seal between the rotor and stator during the rotation of the rotor within the stator.

The opposite sides of the rotor 40 are preferably open, being detachably closed as by the end walls 44 and 46, see FIGURES 5 and 9. There is thus provided a chamber between the end walls 44 and 46 and within the rotor rim which space is utilized to form the variably expansible working chambers of the rotor. Thus, the inner peripheral surface of the rotor is cylindrical as shown at 50 and there are provided a plurality of working chambers 52 therein.

In a preferred form of apparatus there are provided three such chambers as shown in FIGURE 6, and it will be observed that each chamber lies immediately adjacent the periphery of the rotor.

Referring especially to FIGURE 9 it will be observed that the two end walls 44 and 46 are detachably secured and united to the rotor rim 40 as by means of the fastening bolts 54. It will be further noted from FIGURES 5 and 9 that there is a common external cylindrical surface for the rotor rim and the end walls 44 and 46 which is received in the stator cylindrical surface 30, with the end walls projecting slightly laterally from the stator.

Referring now primarily to FIGURE 5 it will be noted that the end walls 44 and 46 are provided with axially laterally outwardly projecting tubular or cylindrical extensions 56 and 58 respectively provided with a removable end wall closure plate 60 secured as by fasteners 62 and an integral end wall or closure plate 64. The closure plate 64 in turn terminates in axially extending integral tubular boss or sleeve 66.

The standard 12 and 14 are provided with respective bearing sleeves 68 and 70 and an integral stub axle or trunnion 72 carried by the removable end wall or closure plate 60 is journalled in the standard 12 while the axially projecting sleeve 66 of the other end wall 46 is journalled in the standard 14. Thus, the rotor is rotatably mounted between the standards, being mounted for rotation upon a horizontal axis extending therethrough.

The engine is further provided with a drive shaft and piston assembly which is rotatable relative to of the rotor piston assembly which is rotatable relative to the rotor movement. Thus, there is provided a drive shaft in the form of a crankshaft indicated generally by the numeral 74 and which includes a pair of crank throws 76 and 78. The throws are disposed at opposite ends of the crank pin 80 and preferably at least one of the throws is removable therefrom to facilitate the assembling and disassembling of the components of the engine. The throw 76 is received within the tubular boss 58 of the wall 46, while the throw 78 is received within the enlargement 56 and is provided with an anti-friction bearing assembly 82 by which it is journalled in the rotor end plate enlargement 56. The bearing assembly 82 serves also as a thrust bearing for axial adjustment of the drive shaft components.

It will be further noted that the end of the drive shaft having the throw 76 is provided with a stub axle 84 which is likewise journalled in a counterbored recess 86 in the tubular boss or sleeve 66. Thus, the drive shaft assembly is rotatably mounted within the rotor assembly and is supported by the latter but is rotatable relative thereof.

Figure 8:
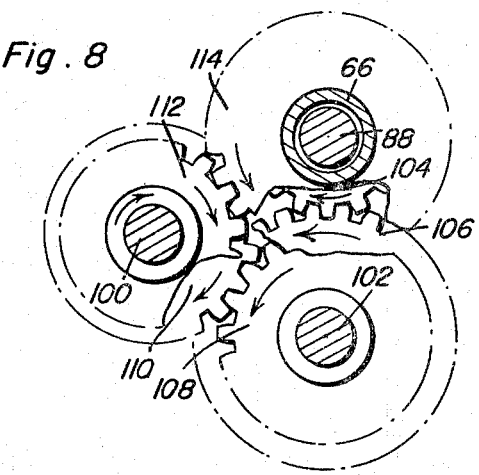
FIGURE 8 is a diagrammatic view of the reduction gearing assembly connecting the clockwise rotating crankshaft to the counter-clockwise rotating rotor of the engine, being taken in vertical sections substantially upon the plane indicated by the section line 8—8 of FIGURE 5 and with parts broken away.

With special reference now to FIGURES 5 and 8 it will be noted that a reduction gear assembly connects the drive shaft 74 to the rotor and to the support structure for effecting different rotations of the rotor and drive shaft assembly in timed relation to each other. Thus, the drive shaft assembly is provided with an axial extension 88 which shall be either integral with or detachably secured to the trunnion or stub shaft 84. This shaft extends through a compartment or chamber 90 formed in the reduction gear assembly housing or casing 92 having an end wall 94. The housing is removably secured to the standard 14 and supported thereby as by means of fastening bolts 96. A suitable bearing or bushing member 98 in the end wall 94 serves to journal the outer end portion of the extension 88 which projecting therebeyond may be utilized as a power take-off means for the engine.

A second pair of shafts 100 and 102 are disposed in parallel relation in the housing 92 with the shaft 102 likewise extending through the end wall 94 to provide a second power take-off means which shall be utilized to provide various significant accessories such as the ignition system and the like.

Fixed on the shaft extension 88 is a gear 104 which is enmeshed with the gear 106 on the shaft 102 for driving the latter. The shaft 102 further has a gear 108 which is meshed with the gear 110 on the shaft 100. A still further gear 112 on the shaft 100 is meshed with the gear 114 fixed to the projecting sleeve 66 of the rotor. In this manner it will be observed that the reduction gearing assembly thus described imparts a different speed of rotation to the rotor from the drive shaft means. Preferably a gear ratio of 3:1 is provided so that the drive shaft assembly will rotate in the opposite direction as the rotor assembly but at a different speed thereby reducing the relative speed of the rotor by ⅓ with a corresponding reduction in the friction between the stator and the rotor while doubling the relative angular rotation between the rotor and the drive assembly.

Reference is next made to FIGURE 6 in conjunction with FIGURE 12. It will be observed that a plurality of mounting brackets 120 are provided by means of which corresponding oscillating vane pistons 122 are pivotally mounted within the rotor for movement in each working chamber. As will be noted from FIGURE 12, each mounting bracket 120 comprises a single piece of material having a convex surface 124 which is adapted to seat against the cylindrical inner surface 50 of the rotor rim 40. Transversely extending bolts 126 extending through transverse bores 128, one for each mounting bracket, are secured to the side walls 44 and 46 to thus securely mount each mounting bracket within the rotor. In one face, each mounting bracket is provided with a cylindrical shaped recess or seat 130 which receives a bearing member 132. Upon its other face, each bracket is provided with a concave face 134 so proportioned that the adjacent edge of a vane piston 122 will smoothly swing thereagainst during its pivotal oscillation.

Each piston comprises an arcuately shaped blade member 140 having at one end thereof a cylindrical shaped transversely disposed rib or bead 142 which is oscillatably received in the bearing member 132 of an adjacent piston mounting bracket. In this manner it will be apparent that each of the pistons is mounted in one of the working chambers 52 for oscillating or swinging movement radially inwardly and outwardly thereof towards and from the peripheral wall 50 of its working chamber. Circumferentially extending sealing elements or strips 144 are provided on the opposite side edges of each piston vane to slidingly engage the side walls of the working chamber defined by the plates 44 and 46, as shown in FIGURE 5. Any suitable spring means 146 may be provided in the circumferentially extending grooves, channels or recesses 148 in the piston vanes 122 to establish a fluid tight seal. Similar sealing strips may be provided in the extremity of the vanes to sealingly and slidingly engage the concave surfaces 134 of the mounting brackets 120 which surfaces thus constitute abutments for the piston elements of the engine.

Intermediate their ends each of the oscillating piston vanes 122 is provided with a pair of lugs 150 which are apertured as at 152. A connecting rod assembly mounted upon the drive shaft 74 and in particular upon the crank pin 80 thereof is connected to the lugs of each of the oscillating pistons so as to cause oscillating movement of the latter to result in rotational movement of the drive shaft 74.

The connecting rod assembly for this purpose is shown in FIGURE 10 and includes a central web or sleeve 160 having an axial bore 162 therethrough in which is received a bushing 164 by means of which the connecting rod element is journalled upon the pin 80. Projecting radially from the sleeve 160 are a plurality of lugs 166 each apertured as at 168 for reception of a pivot pin 170 by which the connecting rod assembly is pivotally secured to the oscillating piston blades. Referring to FIGURE 11 in particular, it will be observed that whereas the apertured ends of each of the connecting rods are of the same dimensions in order to fit into the corresponding apertured lugs of the respective oscillating piston vanes, the other ends are appropriately shaped to be received in a nested relation with each other upon the pin 80 and the bushing 164 thereof. Thus, the link indicated by the letter A has its inner ends provided with widely spaced apertured lugs 180 which interengage with between the identically spaced apertured lugs 182 of the link B which is identical with link A while within the lugs of the links A and B is received a single apertured lug 184 of the innermost link C. The assembled relationship is shown in FIGURE 5. It will thus be apparent that there is provided a very compact connecting rod arrangement for securing operatively the individual oscillating vane pistons to the drive shaft for operating the latter.

As will be noted from FIGURE 5, the longitudinal axis of the crank pin 80, as indicated by the dotted line 190 is slightly offset from the longitudinal axis of the shaft 74 as indicated by the dotted line 192. Consequently, upon relative rotation of the rotor and drive shaft, the connecting rod assembly will impart a swinging movement to the oscillating pistons thereby effecting alternative expansion and contraction of the working chambers 52. It will be noted that the rotor rim 40 has a radially extending passage or port 194 extending therethrough by which each working chamber 52 is communicated with the exterior of the rotor so that upon relative rotation of the rotor and stator, the port 194 will in turn register with the spark plug opening 32, the exhaust port 38 and the charging or intake port 36.

Any suitable means, not shown, will be utilized for delivering air or a combustible mixture to the intake ports while any suitable exhaust manifold means may be provided for permitting the discharge of exhaust products from the exhaust ports 36.

The foregoing is considered as illustrative only of the principles of the invention. Further, since numerous modifications and changes will readily occur to those skilled in the art, it is not desired to limit the invention to the exact construction shown and operation shown and described, and accordingly all suitable modifications and equivalents may be resorted to, falling within the scope of the invention as claimed.

What is claimed as new is as follows:

1. A rotary internal combustion engine comprising a support structure, a drive shaft rotatably mounted in said support structure, a rotor mounted for rotation about the axis of said drive shaft, a gearing assembly connecting said rotor and drive shaft for relative rotation, said rotor having a working chamber therein and an oscillating piston blade in said working chamber operable to expand and contract the volume of the latter, means mounting said piston blade on said rotor for pivotal swinging movement, means connecting said piston to said drive shaft for transfer of movement therebetween, means supplying a combustible mixture to said working chamber, means igniting said combustible mixture within said working chamber, means exhausting combustion products from said working chamber, said support structure including a base, a pair of standards mounted on and rising from said base, bearings in said standards journalling said drive shaft therebetween, said rotor being disposed between said standards and supported thereby, a housing enclosing said gearing assembly and mounted upon the outer side of said one of said standards, a stator, means individually mounting the stator upon said base between said standards, said stator having a central opening therein rotatably receiving said rotor, said stator and rotor having complementary, slidably engaging cylindrical walls, said supplying, igniting and exhausting means being disposed upon said stator and extending therethrough, said working chamber being open and exposed to said stator cylindrical wall.

2. The combination of claim 1 including air cooling fins disposed upon a side of said rotor.

3. The combination of claim 1 including sealing means on said piston blade sealingly and slidably engaging the walls of said working chamber.

4. The combination of claim 1 wherein said blade comprises a plate-like member extending circumferentially of said rotor, said mounting means comprising a socketed connection of said blade and rotor at one end of said blade.

5. The combination of claim 1 including a plurality of circumferentially spaced working chambers in said rotor with a piston operable in each working chamber, said piston mounting means comprising a pivotal connection for each piston blade and swingably connecting the latter to said rotor.

6. The combination of claim 5 wherein said drive shaft has a crank pin thereon eccentric to the axis of rotation of said drive shaft, said connecting means comprising a plurality of connecting links each having one end pivoted to a mid-portion of a piston blade, the other end of each connecting link being journaled on said crank pin.

7. The combination of claim 6 wherein said connecting links have their said other ends disposed in nested side by side relation upon said crank pin.

8. An expansible chamber device comprising, a stator having inlet and outlet ports, and an inner surface, a rotor rotatably mounted by the stator, a drive shaft rotatably mounted in fixed relationship to the stator, said rotor including an annular chamber sealing member having an outer surface conforming to the inner surface of the stator and a plurality of circumferentially spaced flow passages formed therein and a plurality of separate brackets extending radially inwardly from the annular member between said flow passages in radially spaced relation to the drive shaft, reduction gear means drivingly connecting said drive shaft to the rotor for reverse relative rotation sequentially registering said flow passages with the ports of the stator in response to rotation of the drive shaft, a plurality of piston blades pivotally mounted by said brackets within the annular member to form a plurality of radially outer chambers therein respectively in fluid communication with said flow passages and a plurality of radially inner chambers in fluid communication with each other, and connecting means drivingly connecting the drive shaft to the piston blades for movement of the blades between innermost and outermost positions in response to relative rotation between the drive shaft and the rotor, said annular member having an inner surface conforming to the piston blades in the outermost positions thereof.

9. The combination of claim 8 including sealing means on each of said piston blades operatively engaging the rotor to seal the radially outer chambers thereof.

10. The combination of claim 8 wherein said connecting means comprises a link having one end pivoted to said piston blade at the mid-portion thereof and having its other end operatively connected to said drive shaft.

References Cited by the Examiner

UNITED STATES PATENTS

| | | | |
|---|---|---|---|
| 147,623 | 2/1874 | Ellis | 230—154 |
| 1,048,308 | 12/1912 | Hanley | 123—8 |
| 1,209,204 | 12/1916 | Richards | 123—43 X |
| 1,400,255 | 12/1921 | Anderson | 123—17 |
| 1,516,053 | 11/1924 | Morgan | 103—140 |
| 1,715,490 | 6/1929 | Ballerstedt. | |

MARK NEWMAN, *Primary Examiner.*

F. T. SADLER, *Assistant Examiner.*